United States Patent
Audart-Noël et al.

(10) Patent No.: US 8,156,648 B2
(45) Date of Patent: Apr. 17, 2012

(54) HOLLOW STRUCTURAL ROD AND PRODUCTION METHOD THEREOF

(75) Inventors: Virginie Audart-Noël, Pujaudran (FR); Marc Canadas, Toulouse (FR); Alain Grelier, Tigy (FR); Daniel Audri, Lamotte Beuvron (FR)

(73) Assignees: Airbus Operation SAS, Toulouse (FR); Roxel France, St Medard En Jalles (FR)

( * ) Notice: Subject to any disclaimer, the term of this patent is extended or adjusted under 35 U.S.C. 154(b) by 633 days.

(21) Appl. No.: 11/908,972

(22) PCT Filed: Mar. 30, 2006

(86) PCT No.: PCT/FR2006/050273
§ 371 (c)(1),
(2), (4) Date: May 5, 2008

(87) PCT Pub. No.: WO2006/103372
PCT Pub. Date: Oct. 5, 2006

(65) Prior Publication Data
US 2009/0100963 A1    Apr. 23, 2009

(30) Foreign Application Priority Data
Mar. 31, 2005 (FR) ..................................... 05 50840

(51) Int. Cl.
*E04H 14/00* (2006.01)
(52) U.S. Cl. .................. 29/888.09; 29/888.092; 29/463; 29/526.5; 72/370.1; 72/370.01
(58) Field of Classification Search ............... 29/888.09, 29/888.092, 421.1, 527.1, 526.5, 890.053; 72/370.1, 370.01, 370.03, 267
See application file for complete search history.

(56) References Cited

U.S. PATENT DOCUMENTS

| | | | | |
|---|---|---|---|---|
| 4,470,282 | A * | 9/1984 | Hayashi | 72/97 |
| 4,850,315 | A | 7/1989 | Mallas | |
| 5,379,507 | A * | 1/1995 | Lindahl | 29/460 |
| 5,505,106 | A * | 4/1996 | Herman | 74/586 |
| 5,644,953 | A * | 7/1997 | Leng | 74/594.2 |
| 5,964,117 | A * | 10/1999 | Holroyd et al. | 72/258 |
| 6,314,834 | B1 * | 11/2001 | Smith et al. | 74/594.1 |
| 6,349,615 | B1 | 2/2002 | Zimmer et al. | |
| 2002/0092168 | A1 * | 7/2002 | Ihara et al. | 29/898.043 |
| 2003/0024494 | A1 | 2/2003 | Laimbock | |
| 2004/0025446 | A1 * | 2/2004 | Suzuki et al. | 52/27 |
| 2004/0251381 | A1 * | 12/2004 | Pasquer et al. | 244/54 |

FOREIGN PATENT DOCUMENTS

| | | |
|---|---|---|
| DE | 195 32 953 | 3/1997 |
| DE | 197 44 713 | 5/1999 |
| FR | 1 452 811 | 4/1966 |
| FR | 2 541 604 | 8/1984 |

* cited by examiner

*Primary Examiner* — David Bryant
*Assistant Examiner* — Christopher Besler
(74) *Attorney, Agent, or Firm* — Oblon, Spivak, McClelland, Maier & Neustadt, L.L.P.

(57) ABSTRACT

A hollow structural connecting rod including a first end fitting, a second end fitting, and a hollow main portion situated between the first and second end fittings. First and second connecting rod elements are integrally joined to one another and have, respectively, a first hollow shank made in one piece together with the first end fitting and a second hollow shank made in one piece with the second end fitting, the first and second connecting rod elements being joined by a joint situated at mid-length on the connecting rod, and which can be produced via flow-turning. The connecting rod may find particular application to an assembly system to be interposed between an aircraft engine mounting structure and an engine.

20 Claims, 6 Drawing Sheets

HOLLOW STRUCTURAL ROD AND PRODUCTION METHOD THEREOF

TECHNICAL FIELD

This invention relates in general to a hollow structural connecting rod including a first end fitting, a second end fitting as well as a hollow main portion situated between the two end fittings.

Furthermore, the invention also relates to a method of manufacturing such a connecting rod.

A hollow structural connecting rod is understood to mean, for example, any connecting rod capable of transmitting tractive and/or compressive forces within a structure, and having defined dynamic characteristics.

Thus, one particular but non-limiting application of the invention relates to connecting rods intended to constitute a portion of an assembly system arranged between an engine mounting structure and its associated engine, these connecting rods primarily having the purpose of ensuring the take-up of the thrust forces produced by the engine.

However, other applications of the invention are of course conceivable, such as its use in any complex structure in which the connecting rods used must respond to specific rigidities.

PRIOR ART

In the prior art, various embodiments are known for these hollow structural connecting rods intended to be used in complex structures in a high thermal environment, such as those of aircraft engine assembly systems, these connecting rods overall comprising, in their finished state, two end fittings separated by a hollow main portion.

In a first type of embodiment known in the prior art, the connecting rod made of steel or a metal alloy includes a connecting rod shank integrating one of the end fittings, and defining almost the entire hollow main portion. In addition, this connecting rod comprises another element forming the second end fitting, the latter being assembled onto the connecting rod shank, preferably via a screw thread system or else a threaded joint.

In this particular configuration of the prior art, wherein the connecting rod is obtained via the assembly of two elements, the element forming the connecting rod shank usually accounts for 80% of the total length of the connecting rod.

In a second type of embodiment known in the prior art, the connecting rod made of steel or a metal alloy comprises a connecting rod shank which is generally tubular and which constitutes almost the entire hollow main portion. Furthermore, it integrates two other elements consisting of the first and second end fittings, respectively, each assembled to one of the ends of the connecting rod shank, preferably via a screw thread system, a threaded joint, or else by means of a circumferential weld seam produced via laser welding, electron beam welding, TIG/MIG, etc.

One major disadvantage in these two types of embodiment known in the prior art lies in the fact that it is necessary to provide one/two joints at the ends of the connecting rod, each of which is situated in a non-homogeneous stress field. Thus, this joint must then be dimensioned according to the highest stress level of this field, which involves over-dimensioning and therefore inevitable performance losses.

Furthermore, out of necessity, this type of over-dimensioned joint introduces a local overstressing condition which is also detrimental to the overall performance of the connecting rod.

Another significant disadvantage was also identified with respect to these metal connecting rods of the prior art, which are stress and rigidity-dimensioned and intended to be used in a high thermal environment.

This disadvantage stems from the manufacturing techniques used, which all result in the obtainment of cylindrically-shaped connecting rods, usually having a circular cross-section, which inevitably involves a performance compromise in relation to all of the definition criteria and mechanical stresses applied to these connecting rods. As a matter of fact, although the cylindrical shapes obtained can be optimised with respect to tensile stress, they are, on the other hand, more difficult to optimise with respect to buckling or compressive stress.

Finally, the hollow cylindrical shape of the connecting rods also proves to be difficult to optimise with regard to the dynamic responses of these connecting rods, in particular in the sense that the choice of natural frequencies, for a given connecting rod length, is defined solely by the outside diameter and thickness thereof.

OBJECT OF THE INVENTION

The purpose of the invention, therefore, is to propose a hollow structural connecting rod as well as its method of manufacture, which at least partially remedies the aforementioned disadvantages with respect to the embodiments of the prior art.

The invention also has the purpose of providing an assembly system intended to be interposed between an aircraft engine mounting structure and an engine, this system integrating connecting rods for taking up thrust forces, which meet the aforementioned purpose.

In order to accomplish this, the object of the invention is first of all a hollow structural connecting rod including a first end fitting, a second end fitting, as well as a hollow main portion situated between the two end fittings. According to the invention, it includes first and second connecting rod elements integrally joined to one another and having, respectively, a first hollow shank made in one piece together with the first end fitting as well as a second hollow shank made in one piece with the second end fitting, these first and second connecting rod elements being integrally joined to one another by means of a joint situated at mid-length on the connecting rod.

With the structural connecting rod according to the invention, it is possible to significantly reduce the performance losses encountered with the embodiments of the prior art, this being explained in particular by the presence of the joint of the two connecting rod elements at mid-length on the connecting rod, i.e., at the centre portion thereof. As a matter of fact, the specific positioning of this joint in the centre portion enables it to be situated in an area of constant and therefore optimal stress. Thus, there is no unnecessary over-dimensioning to be carried out for this single joint, contrary to the off-centre joints made on the connecting rods of the prior art.

Furthermore, another advantage lies in the fact that each end fitting is made in a single piece together with its associated connecting rod shank, which makes it possible to obtain a very satisfactory structural continuity at the area of transition between these two constituent parts of each connecting rod element. In this regard, it is specified that the fact of having two connecting rod elements each corresponding to a half-connecting rod means that the internal portion of the transition area can be easily optimised via machining, because of the accessibility to the equipment, which is obtained by the short length of these two connecting rod elements, in particular with regard to the length of the connecting rod shanks encountered previously. As will be explained later in greater detail, this advantage is even more remarkable when the hollow shanks are made via the flow-turning technique.

The invention thus makes it possible to have preferably metal connecting rods having improved performance and a high slenderness ratio, being stress and rigidity-dimensioned, having defined dynamic characteristics and being capable of functioning in an environment compatible with the thermal environment for which they are intended.

On these grounds, as just stated, it is indeed preferably anticipated for each of the first and second hollow shanks of the connecting rod according to the invention to be made via flow-turning.

This cold-forming technique via spot extrusion, wherein the loss of material is nearly nil, gives the connecting rods made in this way significant advantages which, in particular, entail a considerable enhancement in the performance thereof.

First of all, it bears pointing out that this technique for cold plastic deformation of the metal makes it possible to obtain, at a lower cost, connecting rod shanks of complex shapes thus capable of being easily optimised completely in relation to the various mechanical stress criteria, such as traction, compression, buckling, dynamic excitation, etc.

Furthermore, this particular technique makes it possible to appreciably increase the mechanical characteristics of the material via strain hardening, in particular as concerns hardness and strength. The gains in terms of increased mechanical characteristics can amount to approximately 15 to 20%.

Although this preferred technique for producing the hollow shanks can possibly be replaced by a conventional lathe-machining method, it is noted that this flow-turning technique is retained for the overall improvement that it is capable of obtaining, in particular as concerns respect for the geometry of the connecting rods, the strength of the material, weight, quality, as well as the costs incurred.

Finally, it is also specified that production of the hollow shanks via flow-turning is carried out with pre-forms having a shorter length than the final length of these hollow shanks. Thus, this technique does indeed promote easy access for the machining means intended to be inserted into the pre-form for the purpose of optimising the shape of the internal portion of the future area of transition, in order to obtain a very satisfactory structural continuity at this area of transition, which ultimately forms the joint between the two constituent parts of each connecting rod element.

The joint between the hollow shanks of the two connecting rod elements is preferably a weld seam made, for example, via friction welding. In this regard, it is noted that the half-connecting rod shape of each the two connecting rod elements being joined together is particularly conducive to producing such a circumferential weld seam via friction welding, which is currently recognised as having an inconsistent level of performance.

In a still preferable manner, the first and second hollow shanks, together forming the hollow main portion of the connecting rod, each have a joint end having an added thickness of material. Thus, this structural reinforcement given locally to each of the two hollow shanks makes it possible to lower the passing stress as concerns the compatibility of the structure integrating the connecting rod.

The first and second hollow shanks preferably each have a cylindrical internal surface, as well as a cylindrical external surface.

Another possibility lies in the fact of anticipating for the first and second hollow shanks to each have a cylindrical internal surface, as well as a non-cylindrical external surface, e.g., having a substantially conical shape, which is easily produced using the flow-turning technique.

Of course, without exceeding the scope of the invention, any other complex shape can be anticipated for the external surface of the hollow shank, in particular so that the latter is completely optimised in relation to the various mechanical stress criteria, such as traction, compression, buckling, dynamic excitation, etc.

The first and second connecting rod elements preferably each have an area of transition between the hollow shank and end fitting concerned, which has a conical exterior shape. It is specified that this specific shape is retained so as to minimise the local overstressing at this area of transition.

On the other hand, it is possible to simultaneously or separately anticipate for the area of transition to include a recess made in one internal side face of the hollow shank delimiting an empty space therein, the recess made then being situated in a non-working section.

On the other hand, an object of the invention is a method of manufacturing such a hollow structural connecting rod, comprising the following steps:
  manufacture of a pre-form for the first connecting rod element as well as a pre-form for the second connecting rod element;
  production via flow-turning of the first and second hollow shanks, from the two pre-forms, respectively; and
  assembly of the first and second hollow shanks to one another.

The assembly of the first and second hollow shanks to one another is carried out via welding, e.g., via friction welding.

The step for manufacturing the two pre-forms is preferably carried out in such a way that each of them has an added thickness of material at a joint end, so that the latter forms the aforementioned reinforcement.

In a case such as this, it is possible to anticipate for this added-on material to not be affected by the step for producing the first and second hollow shanks via flow-turning, so that this added thickness of material retains its desirable mechanical characteristics at the joint.

The step for manufacturing the two pre-forms is carried out so that each of them has a cylindrical internal surface into which a rotating mandrel can be inserted during the step for producing the first and second hollow shanks via flow-turning.

Furthermore, the step for producing the first and second hollow shanks from the pre-forms, via flow-turning, is carried out so that, as desired, each of them has a cylindrical or non-cylindrical external surface. In the latter case, as an illustrative example, the substantially conical shape can be selected.

The step for assembling the first and second hollow shanks to one another is preferably followed by a step for producing the first and second end fittings via machining, these machining operations being performed in an end fitting portion of each of the pre-forms.

On these grounds, the step for producing the first and second end fittings via machining is carried out so that the first and second connecting rod elements each have an area of transition between the hollow shank and the end fitting concerned, which has a conical exterior shape.

On the other hand, prior to the step for assembling the first and second hollow shanks to one another, and preferably prior to the step for producing the first and second hollow shanks via flow-turning, the method comprises, for each of the two connecting rod elements, a step for producing via machining a recess in an internal side face of a hollow shank portion of the pre-form, this internal side face delimiting an empty space of this hollow shank portion.

Finally, it is specified that the steps for manufacturing the two pre-forms are each preferably carried out using a cylindrically-shaped solid element.

Furthermore, an object of the invention is also an assembly system intended to be interposed between an aircraft engine mounting structure and an engine, this assembly system including a plurality of engine fasteners as well as connecting rods for taking up the thrust forces produced by the engine. According to the invention, each of the connecting rods for taking up the thrust forces consists of a hollow structural connecting rod such as the one described above.

Other advantages and characteristics of the invention will become apparent in the non-limiting detailed description below.

BRIEF DESCRIPTION OF THE DRAWINGS

This description will be made in relation to the appended drawings, in which.

DETAILED DESCRIPTION OF PREFERRED EMBODIMENTS

Figure 1:
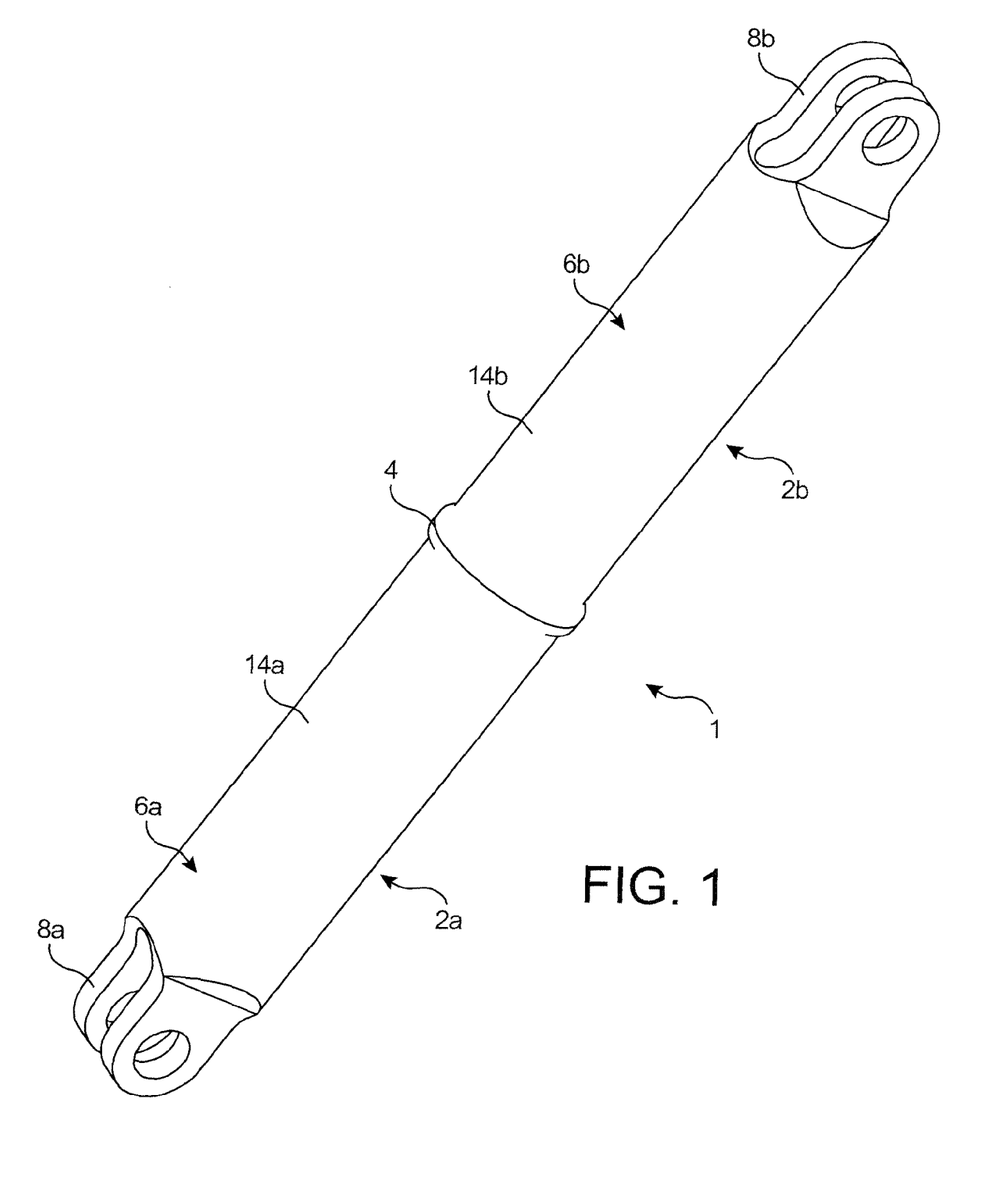
FIG. 1 shows a perspective view of a hollow structural connecting rod according to a preferred embodiment of this invention.
Figure 2:
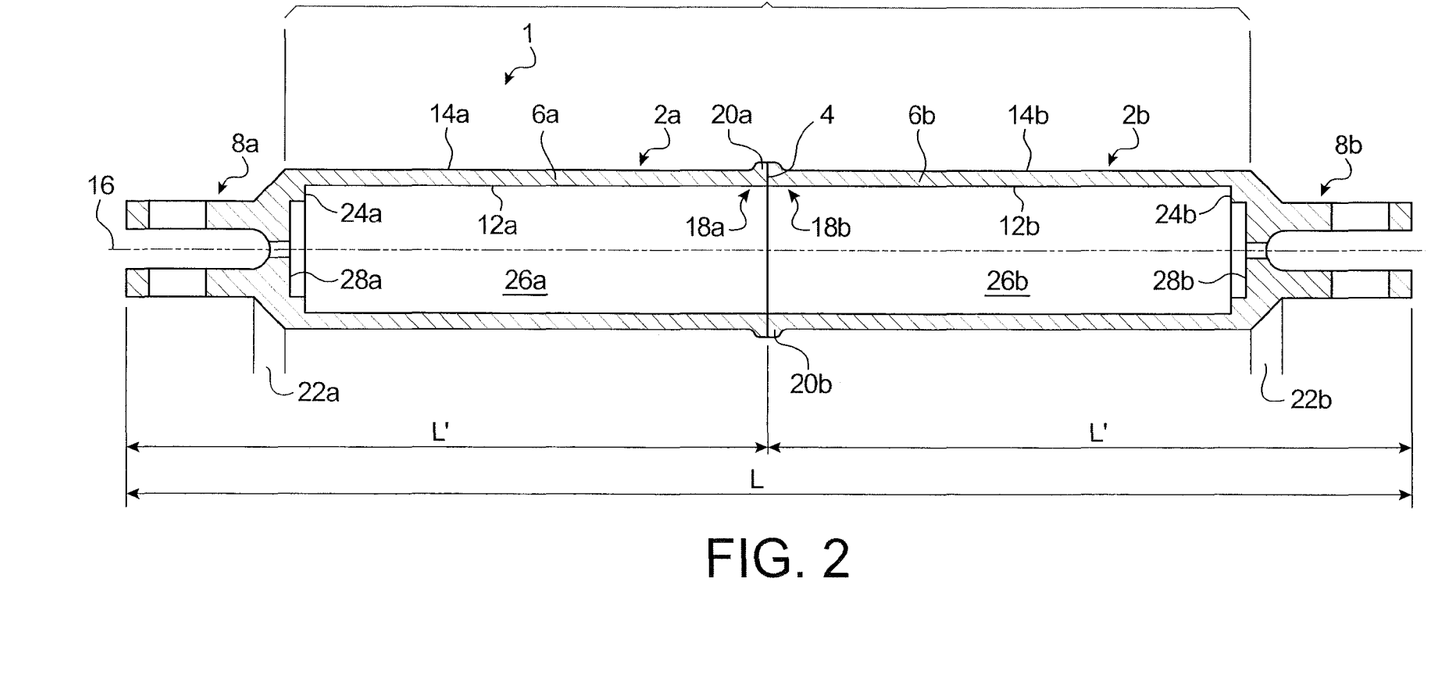
FIG. 2 shows a longitudinal section of the connecting rod shown in FIG. 1.

First of all, with joint reference to FIGS. 1 and 2, a hollow structural connecting rod 1 according to a preferred embodiment of this invention can be seen, which is preferably but not exclusively intended to be used within an assembly system interposed between an aircraft engine mounting structure and an engine.

The connecting rod 1 overall comprises a first and a second connecting rod element 2a, 2b, which are preferably identical, forming two half-connecting rods, respectively. These two connecting rod elements 2a, 2b, integrally joined via a joint 4, have a first and a second hollow shank 6a, 6b, respectively, each of these shanks 6a, 6b being made in a single piece together with the first end fitting 8a and the second end fitting 8b, respectively.

The two connecting rod elements 2a, 2b, jointly forming a hollow main portion 10 of the connecting rod 1, and preferably produced via flow-turning, each have a length L' corresponding to half of the total length L of this connecting rod 1, meaning that the joint 4 is situated at mid-length thereof.

In this preferred embodiment of this invention, the hollow shank 6a has a cylindrical internal surface 12a preferably having a circular cross-section, as well as a cylindrical external surface 14a, also preferably of circular cross-section, each of these surfaces 12a, 14a being arranged along the same longitudinal axis 16 of the connecting rod 1.

As best seen in FIG. 2, the hollow shank 6a has a joint end 18a in contact with the joint 4 and integrating an added thickness of material 20a, this added thickness 20a thus making it possible to introduce a local structural reinforcement for the connecting rod 1.

The first end fitting 8a can have any conventional shape known by those skilled in the art, such as that of an end fitting with two drilled heads, as shown in the figures. It is preferably produced by machining.

The first connecting rod element 2a is provided with an area of transition 22a situated between the first end fitting 8a and the first hollow shank 6a, this area 22a being made so as to have a conical exterior shape, for the purpose of best reducing the local overstressing condition at this area of transition 22a. In addition, a recess 28a is made in an internal portion of this area 22a, i.e., in an internal side face 24a of the shank 6a delimiting an empty space 26a and being substantially orthogonal to the axis 16, which recess also assumes a cylindrical shape of circular cross-section, arranged along this same longitudinal axis 16.

In a way similar to that described above, the second hollow shank 6b has a cylindrical internal surface 12b as well as a cylindrical external surface 14b, each having a circular cross-section, these surfaces 12b, 14b also being arranged along the longitudinal axis 16 of the connecting rod 1.

On the other hand, the second hollow shank 6b has a joint end 18b in contact with the joint 4 and integrating an added thickness of material 20b, for the purpose of creating a local structural reinforcement for the connecting rod 1.

Here again, the second connecting rod element 2b is provided with an area of transition 22b situated between the second end fitting 8b and the second hollow shank 6b, this area 22b being made so as to have a conical exterior shape, for the aforesaid purposes. Furthermore, a recess 28b is made in an internal portion of this area 22b, i.e., in an internal side face 24b of the shank 6b delimiting an empty space 26b and being substantially orthogonal to the axis 16, which recess also assumes a cylindrical shape of circular cross-section, arranged along this same longitudinal axis 16.

The joint 4 takes the form of a circumferential weld seam joining the two joint ends 18a, 18b bearing the two added thicknesses of material 20a, 20b, and overall situated in a mid-plane of the connecting rod 1, also corresponding to a transverse plane of symmetry for the latter.

Figure 4:
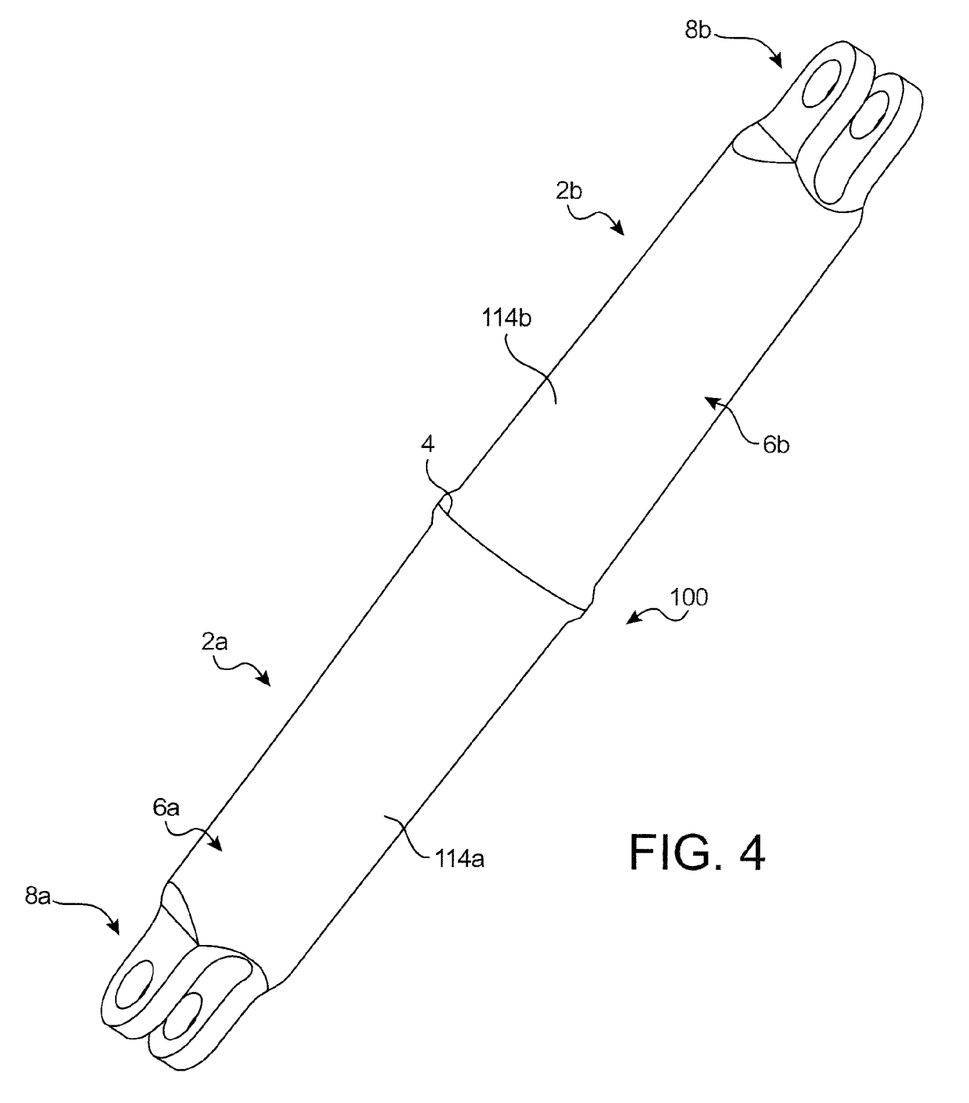
FIG. 4 shows a perspective view of a hollow structural connecting rod according to another preferred embodiment of this invention.

In reference to FIG. 4, a hollow structural connecting rod 100 is shown in the form of another preferred embodiment of this invention.

This connecting rod 100 is substantially similar to the one shown in FIGS. 1 and 2 and described above. In this regard, in the figures, the elements bearing the same numeric references thus correspond to identical or similar elements.

Thus, it can be seen that the only difference between the connecting rods 1 and 100 is in the shape of the external surface 114a, 114b of the first and second hollow shanks 6a, 6b.

As a matter of fact, these surfaces 114a, 114b are not cylindrical like the previously mentioned surfaces 14a, 14b, but have a complex shape, so as to be completely optimised in relation to the various mechanical stress criteria, such as traction, compression, buckling, dynamic excitation, etc. As an indicative example, the shape shown in FIG. 4 corresponds to a substantially conical shape, the cross-sectional area of which increases in the direction of the weld seam 4. Of course, it is also possible here to retain the added thicknesses of material 20a, 20b at the joint ends 18a, 18b, still so as to obtain local structural reinforcements for the connecting rod 1.

A connecting rod manufacturing method according to a preferred embodiment of this invention will be described now with reference to FIGS. 3a to 3g, the purpose of this method being the manufacture of the hollow structural connecting rod 1 shown in FIGS. 1 and 2.

First of all, the various steps for producing the first connecting rod element 2a, prior to its integral connection with the second connecting rod element 2b, will now be described with reference to FIGS. 3a to 3e. On these grounds, it is noted that the way of obtaining the first connecting rod element 2a shown in FIG. 3e is applied identically in order to obtain the second connecting rod element 2b. For this reason, the process for obtaining the second connecting rod element 2b, prior to its integral connection with the first connecting rod element 2a, will not be described further. In addition, it is to be understood that the production of the two connecting rod elements 2a, 2b intended to be subsequently connected, can therefore be carried out successively or simultaneously, without exceeding the scope of the invention.

Figure 3A:
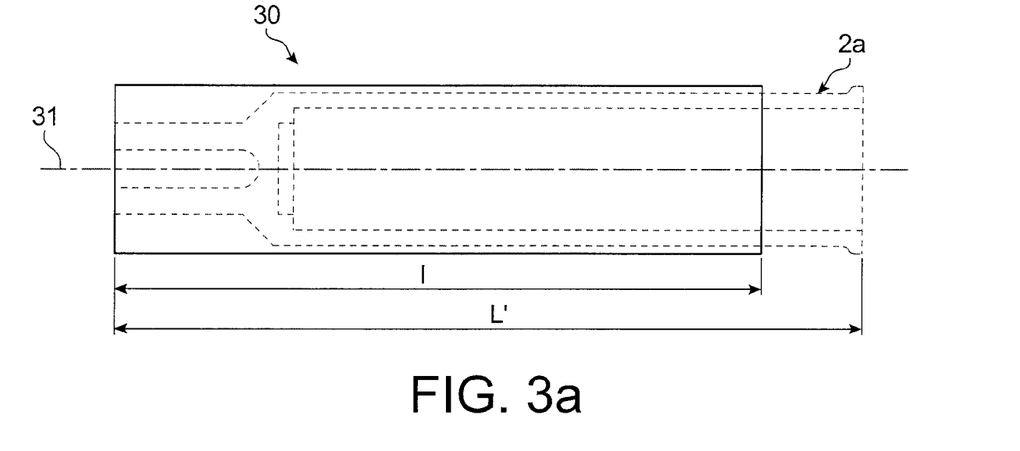
FIGS. 3a to 3g diagram successive steps of a method according to a preferred embodiment of this invention, aiming to manufacture the hollow structural connecting rod shown in FIGS. 1 and 2.

The start-up phase for manufacturing the connecting rod element 2a is carried out by choosing a solid, cylindrically-shaped element 30, preferably having a circular cross-section with a longitudinal axis 31, as shown in FIG. 3a, the dimensions of which are suitable for producing the desired element 2a. This solid element 30 is preferably made of steel or a metal alloy. For the purposes of understanding the invention, the connecting rod element 2a in its finished state has been shown by dotted lines in FIG. 3a, which now makes it possible to observe that, during implementation of the method, the solid element 30 of initial length 1 will undergo an extension of its length enabling it to reach the length L' corresponding to the final length of the connecting rod element 2a.

Figure 3B:
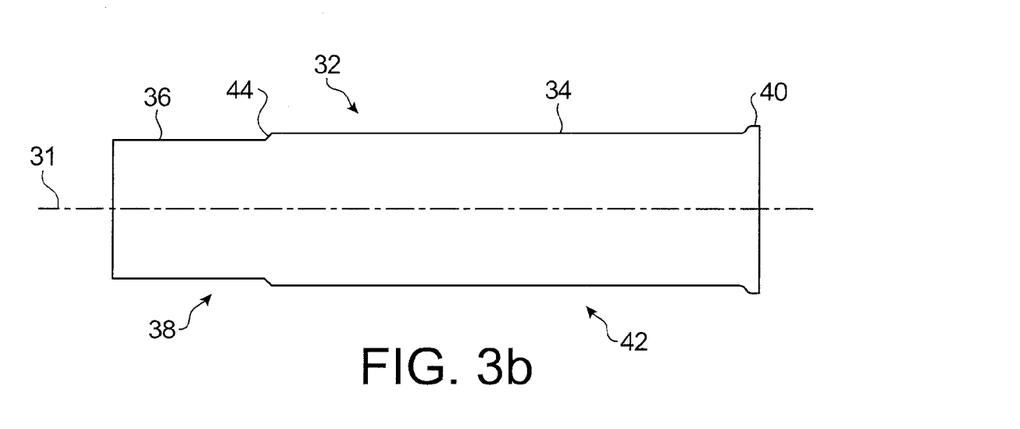

The following step consists in production of the pre-form 32 from the first connecting rod element 2a, e.g., via conventional lathe-machining of the solid element 30, aiming to create a cylindrical external surface 34 on both sides of which are situated a section 36 of smaller diameter at an end fitting portion 38 of the pre-form 32, as well as a section 40 of larger diameter at the free joint end of a hollow shank 42 portion of this same pre-form 32.

For informational purposes, it is specified that the section 40 can be retained without undergoing any modification until the assembly of the two connecting rod elements 2a, 2b, i.e., retained in the state shown in FIG. 3b, without being affected by the flow-turning step that will be described hereinafter.

On the other hand, the section 36 of smaller diameter made at the end fitting portion 38 of the pre-form 32 is substantially provided in order to create a flush break 44 between this section 36 and the external surface 34, this flush break being easily capable of being engaged by the knurled wheels of the equipment used for implementing the flow-turning step.

Figure 3C:
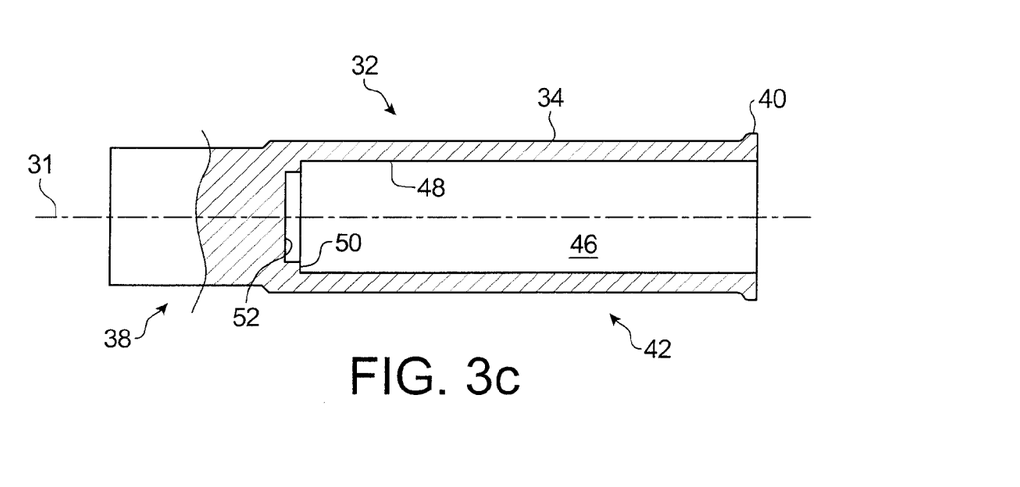

With reference to FIG. 3c, the hollow shank portion 42 next undergoes another machining operation aiming to create an empty space 46 delimited by a cylindrical internal surface 48 having a circular cross-section and a longitudinal axis 31. Furthermore, although this empty space 46 is open on the side of the free joint end of the hollow shank portion 42, it is nevertheless limited opposite this end by an internal side face 50 orthogonal to the axis 31 and situated approximately at the joint between the end fitting 38 and hollow shank 42 portions of the pre-form 32.

A recess 52 is made on this internal side face 50, which also assumes a cylindrical shape of circular cross-section, arranged along this same longitudinal axis 31.

At this stage preceding the flow-turning step, it is appropriate to note that the machining of the end fitting portion 38 has preferably not yet been carried out, and that the hollow shank portion 42 is of course dimensioned on the basis of the volume of material required for producing the hollow shank 6a of the connecting rod element 2a. Furthermore, it is also specified that the diameter of the cylindrical surface 48 has a diameter identical to that provided for the cylindrical internal surface 12a of the hollow shank 6a being manufactured.

Figure 3D:
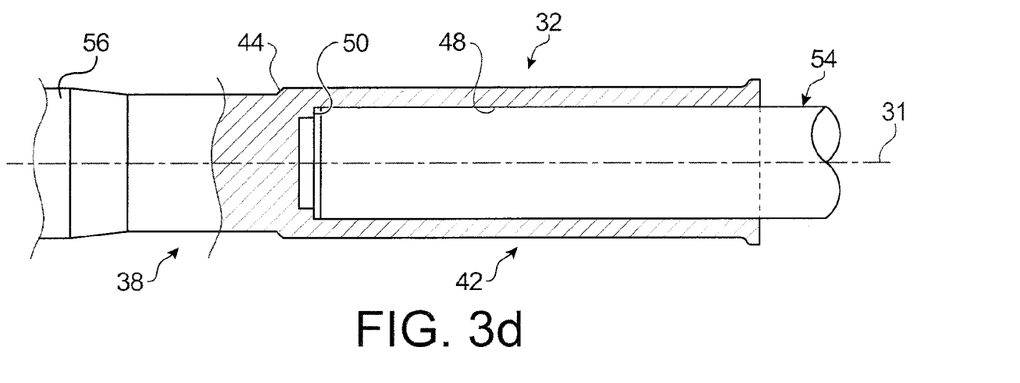
Figure 3E:
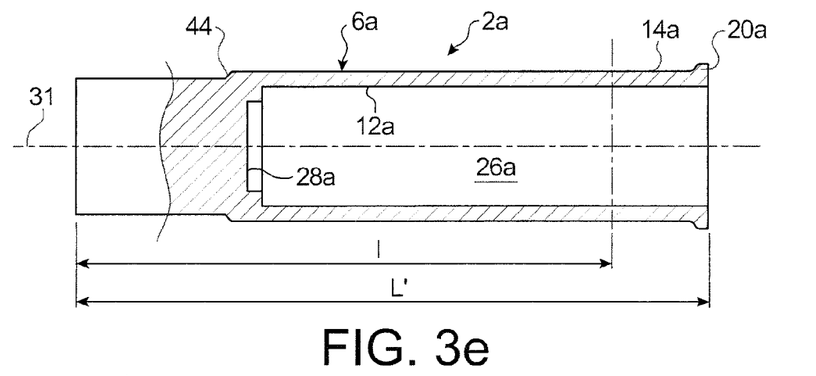

The first hollow shank 6a is then made from the pre-form 32, via flow-turning, as shown schematically in FIG. 3d.

In order to do this, a rotating flow-turning mandrel 54, having a diameter substantially identical to that of the cylindrical internal surface 48, is inserted into the space 46 so as to fill it up, until coming into contact with the side surface 50. A tailstock 56 in exterior contact with the end fitting portion 38 applies the pressure required for holding the pre-form 32 on the mandrel 54, on the one hand, and for driving this pre-form 32 in rotation, on the other hand.

At the end of this flow-turning step, carried out conventionally and for the purpose of pushing the material of the flush break 44 back towards the joint end of the hollow shank portion 42, the first connecting rod element 2a is then obtained, having a longitudinal axis 31 and equipped with its connecting rod shank 6a having the external surface 14a of the desired shape, i.e., in this case, cylindrically shaped and of circular cross-section.

As shown in FIG. 3e, by schematically comparing the two lengths L' and l, it can be seen that the flow-turning step has resulted in a lengthening as well as a reduction in the thickness of the hollow shank portion 42, in order to form the hollow shank 6a, whereas, as concerns the end fitting portion 38, it has not undergone any modification during this step. It is noted that this step, for example, can be conducted in two passes, so as to introduce a reduction ratio possibly amounting to 80% ((initial thickness−final thickness)/initial thickness), as well as an increase in the mechanical strength via strain hardening of the order of 15 to 20%.

A the end of the flow-turning step, the cylindrical internal surface 48 of the pre-form 32 is thus transformed in order to provide the cylindrical surface 12a of the same diameter and of increased length, and defining the empty space 26a. On the other hand, the shape of the recess 52 of the pre-form 32 has not been modified, and the latter now corresponds to the recess 28a of the hollow shank 6a. Similarly, and as mentioned previously, the section 40 has been retained without undergoing, any modification, and now corresponds to the added thickness of material 20a.

Figure 3F:
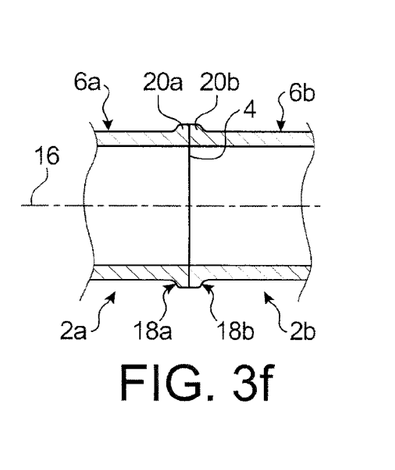

Once the two connecting rod elements 2a and 2b are obtained in the manner described above, and since they are therefore in a shape identical to that shown in FIG. 3e, a step for assembling the first and second hollow shanks 6a, 6b of these connecting rod elements 2a, 2b is carried out, preferably via welding, and even more preferably via friction welding. Thus, the aforesaid joint 4 appears while taking the form of a circumferential weld seam joining the two joint ends 18a, 18b bearing the two added thicknesses of material 20a, 20b, this joint 4 then being capable of obtaining very high performance levels.

Another advantage resulting from the manner of working lies in the fact that the two connecting rod elements 2a, 2b being assembled via friction welding do not need to undergo angular indexing prior to friction welding, given that their respective end fittings 8a, 8b have not yet been machined. Thus, at the end of the step for assembling the two hollow shanks 6a, 6b, it suffices to provide for the two connecting rod elements 2a, 2b to be arranged coaxially along the axis 16 coincident with the two longitudinal axes 31 of these two connecting rod elements.

Furthermore, it is noted that although the friction welding technique is actually preferred, other assembly techniques known by those skilled in the art are also conceivable without exceeding the scope of the invention, such as laser welding, electron beam welding, TIG/MIG welding, etc.

Figure 3G:
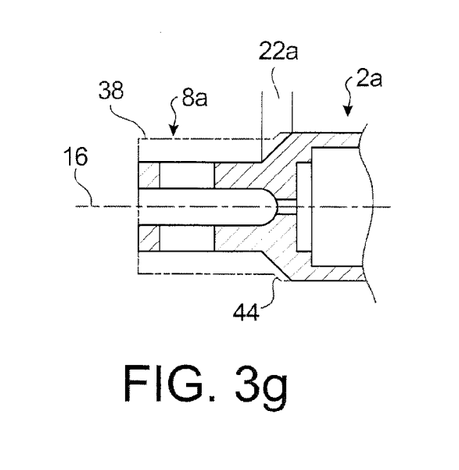

Next, as shown in FIG. 3g for the first connecting rod element 2a, the end fitting portion 38 diagrammed by dotted lines undergoes a machining operation so as to create the end fitting 8a of the desired shape, this machining operation being capable, for example, of being carried out with a numerically controlled milling machine. In addition, during this machining step, the area of transition 22a having a conical exterior shape is also made, which thereby eliminates the flush break 44 initially provided on the pre-form 32.

Of course, these operations are also carried out identically for the second connecting rod element 2b.

Finally, other conventional steps can then be carried out, such as a heat treatment, if this proves to be necessary, or else a mechanical finishing operation guaranteeing the interchangeability of the connecting rods 1.

Figure 5:
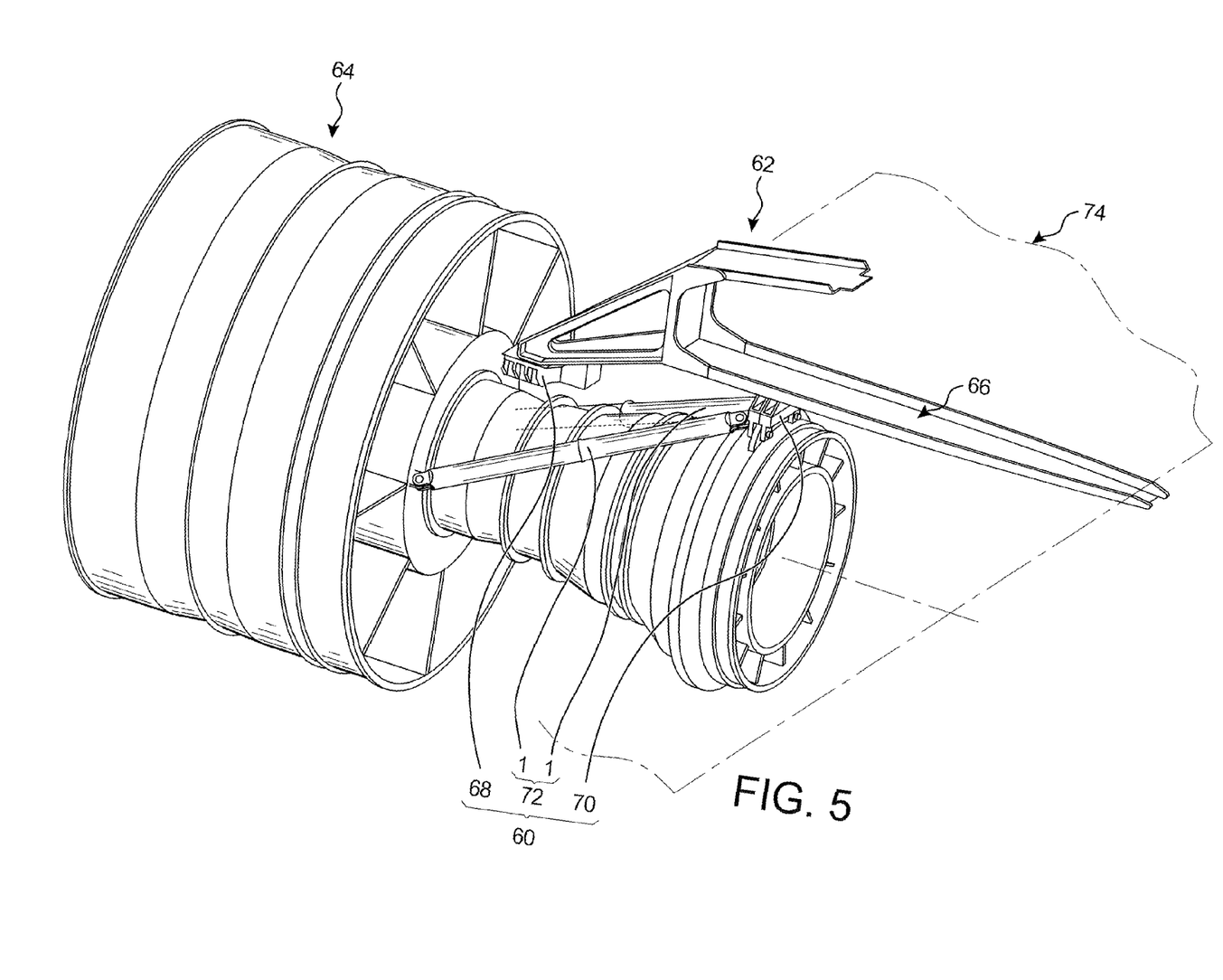
FIG. 5 shows an assembly system intended to be interposed between an aircraft engine mounting structure and an engine, this system being in the form of a preferred embodiment of this invention and integrating connecting rods such as the one shown in FIGS. 1 and 2.

With reference to FIG. 5, an assembly system 60 can be seen, which is interposed between an aircraft engine mounting structure 62 and an engine 64, this system 60 assuming the form of a preferred embodiment of this invention.

As can be clearly seen in this FIG. 5, the assembly system 60, arranged between the engine 64 and a rigid structure 66 of the engine mounting structure 62, conventionally, and in a manner known by those skilled in the art, includes a front fastener 68, a rear fastener 70, as well as a device for taking up the thrust forces 72 produced by the engine 64.

The distinctiveness of the assembly system 60 is therefore based on the design of this device for taking up thrust forces 72, which consists of two hollow structural connecting rods 1 such as those that were presented above.

These two connecting rods 1, which are also referred to as long connecting rods, and which are capable of exceeding a length of two metres, are on the one hand each attached to a front portion of a delivery casing of the engine 64, as well as to the rear fastener 70.

Of course, without exceeding the scope of the invention, the assembly system 60 could alternatively have a device for taking up thrust forces which has short connecting rods, in which these connecting rods are connected to the front fastener instead of the rear fastener. Therefore, it is quite obviously specified that the application of this assembly system 60 is not limited to the case shown in FIG. 5, where the engine 64 is intended to be suspended beneath the wings 74 of the aircraft.

Of course, those skilled in the art can introduce various modifications in the connecting rods 1, 100, the method of manufacture, as well as the assembly system 60, which have just been described for non-limiting illustrative purposes only. In particular, the method described, and more specifically its step for producing the first and second hollow shanks via flow-turning, can be adapted so as to obtain a hollow structural connecting rod as shown in FIG. 4. Furthermore, the assembly system for an aircraft engine could also be designed so that its device for taking up thrust forces integrates hollow structural connecting rods as shown in FIG. 4.

The invention claimed is:

1. A method of manufacturing a hollow structural connecting rod for an aircraft engine assembly, said method comprising:

manufacturing a first pre-form for a first connecting rod element from a first billet and a second pre-form for a second connecting rod element from a second billet, the manufacturing the first and second pre-forms resulting in to-be-connected first ends thereof having an added thickness of material compared to medial portions thereof;

machining first and second hollow shanks in the first ends of the first and second pre-forms, respectively;

flow-turning the first and second pre-forms, respectively, by inserting a rotating flow-turning cylindrical mandrel into the first and second hollow shanks, to lengthen the first and second hollow shanks, wherein a length of the first hollow shank is equal to a length of the second hollow shank; and assembling the first hollow shank to the second hollow shank at the first ends thereof to form an integrally joined assembly of said first and second connecting rod elements such that the joint between the first and second hollow shanks is located at a mid-length of the integrally joined assembly to take up aircraft engine thrust forces when said assembly is interposed between an aircraft engine structure and an engine.

2. A method of manufacturing the hollow structural connecting rod of claim 1, wherein the assembling the first and second hollow shanks to one another is carried out via welding.

3. A method of manufacturing the hollow structural connecting rod of claim 2, wherein the assembling the first and second hollow shanks to one another is carried out via friction welding.

4. A method of manufacturing the hollow structural connecting rod as claimed in claim 1, wherein the machining the first and second hollow shanks is carried out so that each has a cylindrical internal surface and so that the rotating flow-turning cylindrical mandrel can be inserted into the first and second hollow shanks during the flow-turning.

5. A method of manufacturing the hollow structural connecting rod as claimed in claim 1, wherein the flow-turning is carried out so that each of the first and second pre-forms has a cylindrical external surface.

6. A method of manufacturing the hollow structural connecting rod as claimed in claim 1, wherein the flow-turning is carried out so that each of the first and second pre-forms has a non-cylindrical external surface.

7. A method of manufacturing the hollow structural connecting rod of claim 6, wherein the flow-turning is carried out so that each of the first and second pre-forms has a substantially conical external surface.

8. A method of manufacturing the hollow structural connecting rod as claimed in claim 1, wherein the assembling the first and second hollow shanks to one another is followed by producing first and second end fittings via machining, the machining being performed in an end fitting portion of each of the pre-forms.

9. A method of manufacturing the hollow structural connecting rod of claim 8, wherein the producing the first and second end fittings via machining is carried out so that the first and second connecting rod elements each have an area of transition between the hollow shank and the end fitting concerned, which has a conical exterior shape.

10. A method of manufacturing the hollow structural connecting rod as claimed in claim 1, wherein, prior to at least one of the assembling the first and second hollow shanks to one another and the flow-turning, the method further comprises, for each of the first and second connecting rod elements, producing via machining a recess in an internal side face of the hollow shank of the first or second pre-form or both, the internal side face delimiting an empty space of the hollow shank.

11. A method of manufacturing the hollow structural connecting rod as claimed in claim 1, wherein the manufacturing the two pre-forms are each carried out using a solid, cylindrically-shaped element.

12. A method of manufacturing the hollow structural connecting rod of claim 1, wherein said flow-turning is performed by rotating a mandrel having a diameter substantially identical to that of a cylindrical internal surface of said first and second pre-forms.

13. A method of manufacturing the hollow structural connecting rod of claim 1, said method comprising a step of choosing dimensions and material for said first and second pre-forms such that said integrally joined assembly is capable of taking up aircraft engine thrust forces when said assembly is interposed between an aircraft engine structure and an engine.

14. A method of manufacturing the hollow structural connecting rod of claim 13, said method comprising choosing said first and second pre-forms such that said first and second connecting rods exceed a length of two meters.

15. A method of manufacturing the hollow structural connecting rod of claim 13, said method comprising choosing steel as the material for said first and second pre-forms.

16. A method of manufacturing the hollow structural connecting rod of claim 1, said method comprising a step of extending a length of said first and second pre-forms to a final length of the first and second connecting rod.

17. A method of manufacturing the hollow structural connecting rod of claim 1, wherein the first connecting rod element is manufactured from a single piece and the second connecting rod element is manufactured from a single piece.

18. A method of manufacturing the hollow structural connecting rod as claimed in claim 1, further comprising:
after the assembling the first end of the first hollow shank to the first end of the second hollow shank, producing a first end fitting on a second end of the first hollow shank and a second end fitting on a second end of the second hollow shank via machining.

19. A method of manufacturing the hollow structural connecting rod as claimed in claim 1, the assembling including:
friction welding the first ends of the first and second pre-forms having the added thickness together.

20. A method of manufacturing the hollow structural connecting rod as claimed in claim 1, wherein:
in the flow-turning the first and second pre-forms, wall thicknesses of the first and second hollow shanks are reduced while maintaining inner diameters of the first and second hollow shanks so as to lengthen the first and second hollow shanks.

* * * * *